United States Patent
Jahnke et al.

(10) Patent No.: US 6,829,669 B2
(45) Date of Patent: Dec. 7, 2004

(54) BUS BRIDGE INTERFACE SYSTEM

(75) Inventors: Steven R. Jahnke, Tokyo (JP); Hiromichi Hamakawa, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 479 days.

(21) Appl. No.: 09/932,377

(22) Filed: Aug. 17, 2001

(65) Prior Publication Data

US 2002/0052995 A1 May 2, 2002

Related U.S. Application Data

(60) Provisional application No. 60/231,087, filed on Sep. 8, 2000.

(51) Int. Cl.[7] ............................................... G06F 13/36

(52) U.S. Cl. ........................... 710/306; 710/52; 710/60

(58) Field of Search ............................... 710/8, 22, 29, 710/52, 53, 55, 56, 57, 58, 60, 62, 100, 104, 300, 303, 305, 306, 312, 315

(56) References Cited

U.S. PATENT DOCUMENTS

| | | | | |
|---|---|---|---|---|
| 5,678,063 A | * | 10/1997 | Odom et al. | 710/22 |
| 6,115,760 A | * | 9/2000 | Lo et al. | 710/52 |
| 6,477,607 B1 | * | 11/2002 | Jeong | 710/305 |
| 6,532,511 B1 | * | 3/2003 | Brooks | 710/305 |
| 6,571,308 B1 | * | 5/2003 | Reiss et al. | 710/315 |
| 6,601,118 B1 | * | 7/2003 | Rooney | 710/56 |
| 6,678,756 B1 | * | 1/2004 | Tseng et al. | 710/52 |

* cited by examiner

*Primary Examiner*—Khanh Dang
(74) *Attorney, Agent, or Firm*—Robert D. Marshall, Jr.; W. James Brady, III; Frederick J. Telecky, Jr.

(57) ABSTRACT

A bus bridge is defined to provide an interface between two AHB buses. These busses normally have separate requirements but both must provide high performance. The first is for transfer of data from CPU to memory and peripherals. The second is to support the transfer of a large amount of data by a single peripheral to local memory or other local peripherals. The AHB-to-HTB bus bridge provides a means for the interfacing these two separate AHB buses allowing communication between them and securing data integrity. The bus bridge of this invention is defined to be an AHB memory bus slave but a high performance data transfer bus master.

15 Claims, 5 Drawing Sheets

BUS BRIDGE INTERFACE SYSTEM

This application claims priority under 35 USC §119(e)(1) of Provisional Application No. 60/231,087, filed Sep. 8, 2000.

TECHNICAL FIELD OF THE INVENTION

The technical field of this invention is micro-controllers, which are widely applied in complex computer systems having multiple busses. Multiple bus systems must provide bus controllers to allow for coherent and collision-free communication between the separate buses. Micro-controllers used for this purpose provide bus arbitration which determines, at a given time, which device has control of the bus in question. The present invention describes a crucial device element in the implementation of multiple bus micro-controllers, the bus bridge interface system.

BACKGROUND OF THE INVENTION

As computer systems have grown more complex, it has become common to employ multiple processors and a wide variety of peripheral devices to transfer data within a chip and from the chip to external devices and vice versa. Such systems almost always have a multiple set of busses separating, for convenience and performance reasons, the communication between similar devices. Multiple bus systems must provide bus controllers to allow for coherent and collision-free communication between separate buses. Micro-controllers are used for this purpose and they provide bus arbitration which determines, at a given time, which device has control of the bus in question.

A prominent standard bus system has emerged for high performance micro-controller designs. The Advanced Micro-controller Bus Architecture System AMBA has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

The standard AMBA has two main busses, a high performance AHB bus and a peripheral bus APB of more moderate performance. The AHB bus is the main memory bus and contains RAM and an external memory controller. In this basic system definition, if a high performance peripheral is required that will transfer large amounts of data, this peripheral is also placed on the high performance AHB bus. This decreases system performance, however, because the central processor unit (CPU) cannot have access to memory when the peripheral has control of the bus.

Advanced RISC Machines Ltd (ARM) has proposed an efficient arbitration scheme and split transfers to allow the CPU and the high performance peripheral to share bus time of the single AHB bus. ARM has also proposed use of a second bus for isolation and using a single arbiter. This proposal still allows only one transaction to progress at a given time period.

SUMMARY OF THE INVENTION

This invention describes an advanced high performance bus bridge, also known as AHB-to-HTB (High performance data Transfer Bus) bus bridge. The AHB-to-HTB bus bridge of this invention provides a means for the interfacing of two separate AHB-style busses allowing communication between them. and securing data integrity. Since these busses have different characteristics, one for CPU support and the other for support of a large amount of data transfer by a single peripheral, the bus bridge is defined with clear master-slave protocol.

The AHB-to-HTB bus bridge is a slave to the memory AHB bus and a master on the high performance data transfer bus, called the HTB bus. The HTB bus is also an AHB bus in timing and protocol. The AHB-to-HTB bus bridge contains all the slave AHB bus signals on the memory bus side but will generate the master AHB signals on the high performance data transfer bus side. The AHB-to-HTB bus bridge will also generate timing to guarantee data integrity between the two AHB-style busses. When a memory bus master wishes to either read from or write data to the high performance data transfer bus, the AHB-to-HTB bus bridge creates timing conditions to prevent read-after-write (RAW) hazards and write-after-read (WAR) hazards due to potential delays induced in bus synchronization and arbitration.

BRIEF DESCRIPTION OF THE DRAWINGS

These and other aspects of this invention are illustrated in the drawings, in which.

DETAILED DESCRIPTION OF PREFERRED EMBODIMENTS

The multiple transaction advanced high performance bus system (MTAHB) of this invention is used as an upgrade to the micro-controller bus architecture (AMBA) of Advanced RISC Machines Ltd. (ARM). The AMBA machines use RISC processors which are identified by the name ARM processors. Advanced RISC Machines Ltd. (Cambridge, U.K.) has been awarded U.S. Pat. No. 5,740,461, dated Apr. 14, 1998 in which this class of machines is fully described. The techniques used in this invention are of wider applicability, as will be shown, and can be used in a variety of multi-processor systems having multiple bus architectures.

Figure 1:
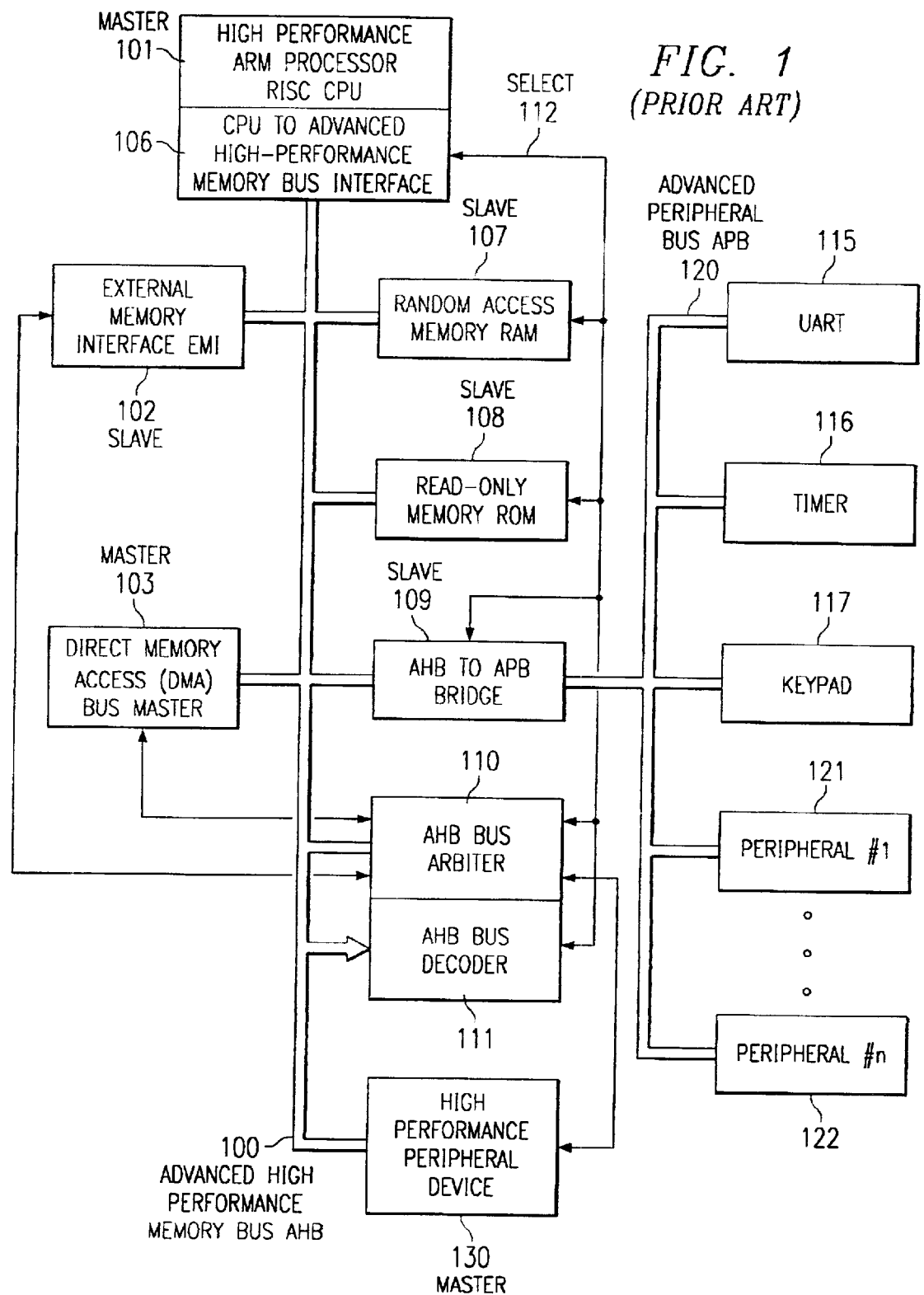
FIG. 1 illustrates the block diagram of a prior art advanced micro-controller bus architecture AMBA having a conventional AHB bus system.

FIG. 1 illustrates the AMBA standard. The AMBA has two main busses, an advanced high performance bus (AHB) 100 and an advanced peripheral bus (APB) 120 of more moderate performance. AHB bus 100 is the main memory bus and couples to CPU 101 via CPU advanced high performance memory bus interface 106 to random access memory (RAM) 107, read-only memory (ROM) 108 and an external memory interface (EMI) controller 102. FIG. 1 further illustrates a second master device direct memory access (DMA) unit 103 also coupled to AHB bus 100. Arbitration for bus access between the two masters, CPU 101 and DMA 103, takes place in M-bus arbiter 110. M-bus arbiter 110 controls access to the various slave devices via M-bus decoder 111 and select lines 112. In this basic system definition, if a high performance peripheral is required that will transfer large amounts of data, this peripheral is also placed on the high performance AHB bus 100. FIG. 1 illustrates such a high performance peripheral device 130. Placing this high performance peripheral device 130 on AHB bus 100 decreases system performance, because CPU 101 and DMA 103 cannot have access to memory when high performance peripheral device 130 has control of AHB bus 100. ARM has proposed an efficient arbitration scheme and split transfers to allow the CPU 101, DMA 103 and the high performance peripheral 130 to share bus time of the single AHB bus 100.

ARM has also proposed use of a second bus for isolation and using a single arbiter. As shown in FIG. 1, this second bus is called the advanced peripheral bus (APB) 120. APB bus 120 operates in the same fashion as AHB bus 100. APB bus 120 is connected to AHB bus 100 via an AHB-to-APB bus bridge 109. AHB-to-APB bus bridge 109 is a slave to AHB bus 100. The two bus system with single M-bus arbiter 110 is of limited usefulness, because it allows only one transaction to progress at a given time period. Note that all high performance devices including memory and high performance peripheral device 130 are on AHB bus 100. All peripheral devices of moderate performance including UART 115, timer 116, keypad 117 as well as peripherals 121 to 123 reside on the peripheral bus 120.

Figure 2:
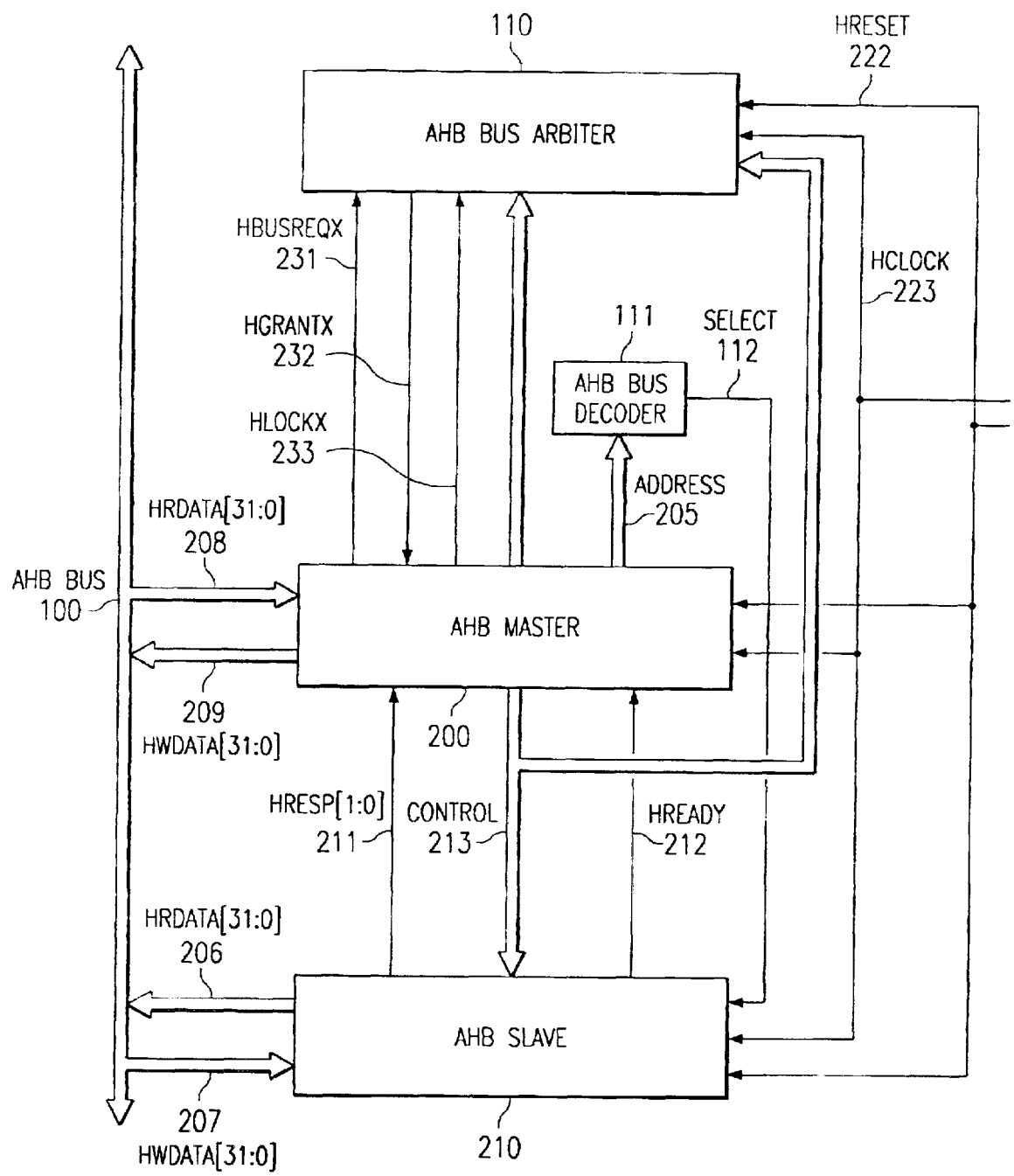
FIG. 2 illustrates the signal interconnections of a prior art single master, slave and arbiter combination in the AMBA architecture.

FIG. 2 illustrates the signal flow between a master requesting control of the AHB bus, the arbiter performing the arbitration decision and the slave selected by the master for a command to be executed in this standard AMBA system. AHB bus arbiter 110, AHB master 200 and AHB slave 210 each receive a reset signal HResetx 222 and a clock signal HClockx 223. The AHB master 200 makes the request of AHB arbiter 110 by activating HBusReqx signal 231. The AHB master 200 receives permission from AHB arbiter 110 by HGrantx signal 232. The AHB master 200 confirms the grant and locks this arbitration decision by HLock signal 233. AHB master 200 then sends address 205 to AHB decoder 111. AHB decoder 111 activates a select signal 112 supplied to the selected slave device. In this example the selected slave device is AHB slave 210. The interaction of AHB master 200 and AHB slave 210 is completed via the control signals 213 and acknowledged via HResp signal 211 and HReady signal 212. Data for read and write operations flows between all masters and all slaves via the AHB bus 100. AHB slave 210 supplies data to AHB bus 100 via HRData[31:0] bus 206 and receives data from AHB bus 100 via HWData[31:0] bus 207. Likewise, AHB master 200 receives data from AHB bus 100 via HRData[31:0] bus 208 and supplies data to AHB bus 100 via HWData[31:0] bus 209. Note in this regard that reads and writes are considered from the point of view of AHB master 200. Thus in a data read data flows from AHB slave 210 to AHB bus 100 via HRData[31:0] bus 206 and from AHB bus 100 via HRData[31:0] bus 208. Of course only one master is activated at a given time and this master selects only one slave on which it will execute a transfer (read or write) command.

Figure 3:
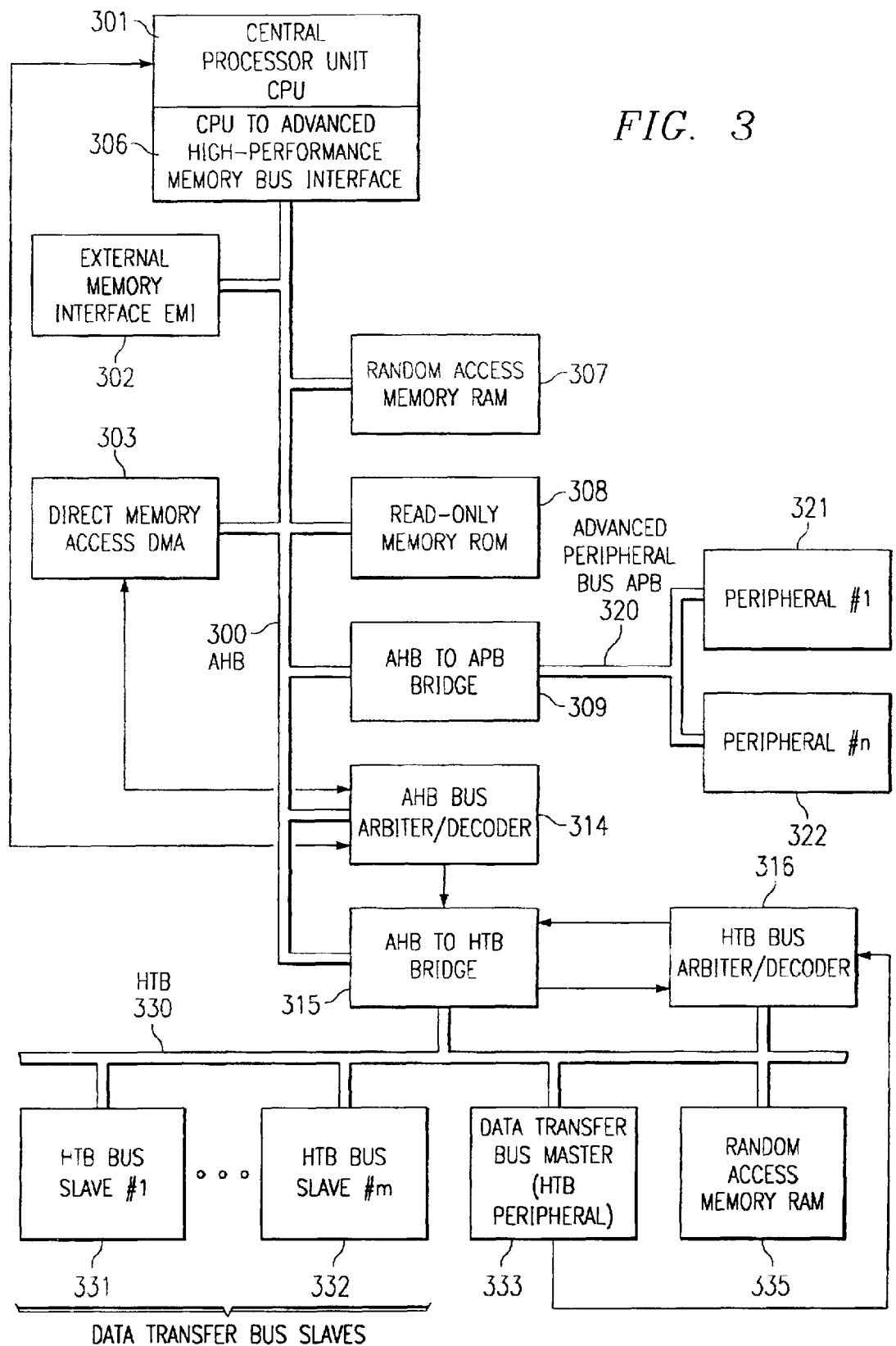
FIG. 3 illustrates the block diagram of an enhanced advanced micro-controller bus architecture having the multiple transaction two AHB-style bus system of this invention with two arbitrators.

FIG. 3 illustrates the multiple transaction advanced high performance bus system (MTAHB) of this invention. The MTAHB uses two AHB-style buses: AHB bus 300 retained as a memory bus; and HTB bus 330 provided for high data transfer bus. AHB bus 300 has AHB bus arbiter/decoder 314 and HTB bus 330 has HTB bus arbiter/decoder 316. Communication between AHB bus 300 and HTB bus 330 takes place via AHB-to-HTB bus bridge 315. AHB-to-HTB bus bridge 315 provides more than just isolation between AHB bus 300 and HTB bus 330. AHB-to-HTB bus bridge 315 also allows for efficient communication between the two high performance busses. In this respect, MTAHB provides three main features:

1. a write buffer to reduce the number of stalls to the CPU 310 while writing to HTB bus 315;
2. a time-out counter allowing CPU 301 to change tasks if a read of HTB bus 330 takes too long; and
3. a set of control registers and control logic as required in bus-master devices.

The AHB bus 300 should contain as slaves only the blocks closely related to memory as well as AHB-to-APB bus bridge 309 to APB bus 320 and AHB-to-HTB bus bridge 315 to HTB bus 330. Note that APB bus 320 connects to moderate performance peripherals 321 to 322 in the same manner as illustrated in FIG. 1. HTB bus 330 contains bus slave peripherals 331 and 332, bus master peripheral 333 and RAM 335. HTB bus 330 supports only two bus masters, high priority data transfer bus master peripheral 333 and AHB-to-HTB bus bridge 315. If more bus masters are required, another HTB bus can be added to the system through the use of another AHB-to-HTB bus bridge, connected as a slave on AHB bus 300.

Figure 4:
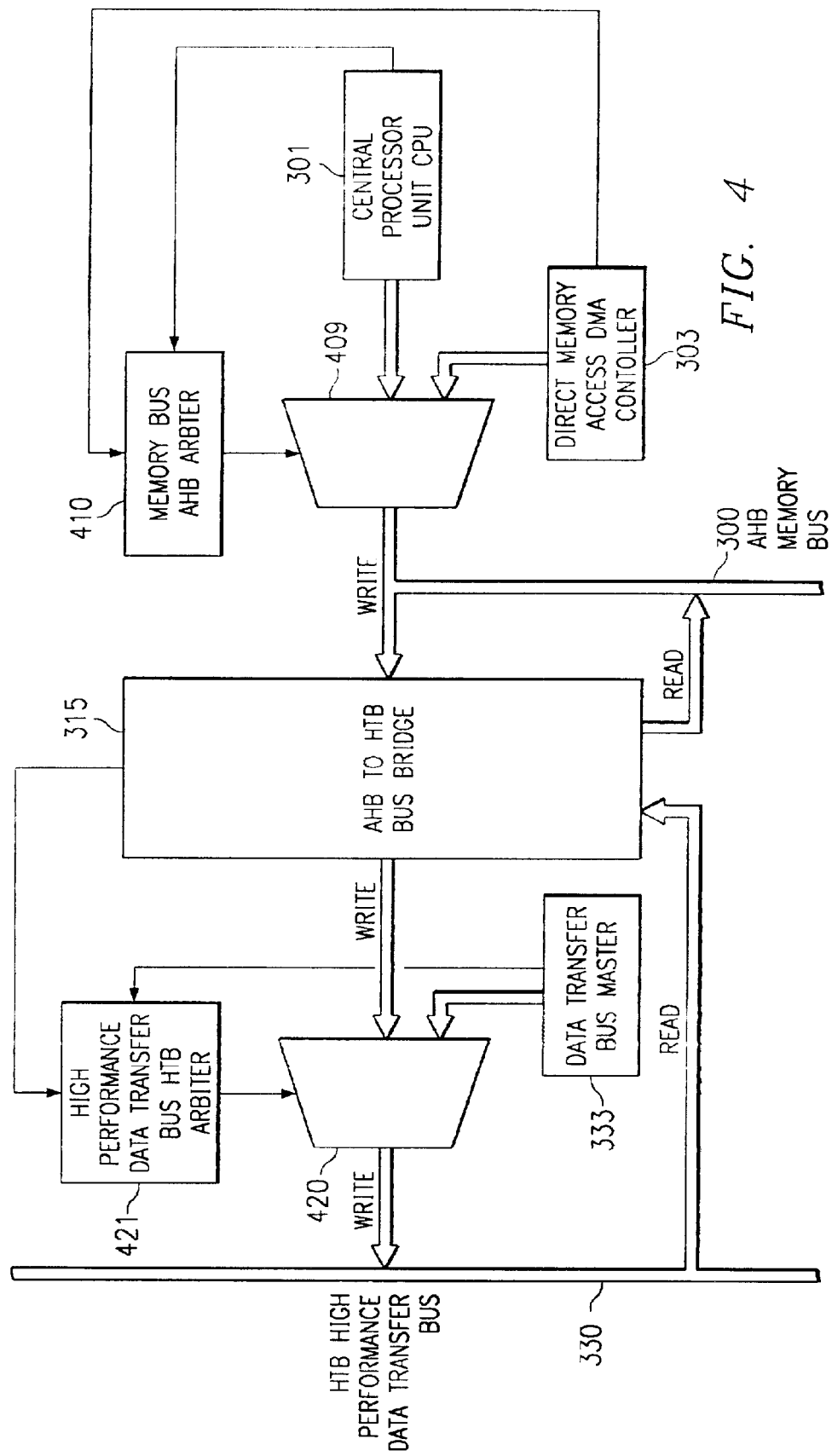
FIG. 4 illustrates the interactions between AHB memory bus arbiter and HTB high performance data transfer bus arbiter functions.

FIG. 4 illustrates the interactions between AHB bus arbiter 410 and HTB bus arbiter 421. When a device on the AHB bus 300, such as CPU 301 or DMA 303, wishes to communicate with a device on HTB bus 330 the following steps must occur. First, the device (CPU 301 or DMA 303) must win arbitration on the AHB bus 300. This is shown pictorially as a multiplexing operation where multiplexer 409 under control of AHB bus arbiter 410 selectively couples either CPU 301 or DMA 303 to AHB bus 300. In the actual implementation it is more common to tie attach three-state I/O interface stages from each device attached to the bus.

Next, AHB-to-HTB bus bridge 315 must win arbitration on the HTB bus 330. This is also shown as a multiplexing operation where multiplexer 420 under control of HTB arbiter/decoder 421 selectively couples either AHB-to-HTB bus bridge 315 or HTB bus master 333 to HTB bus 330. During this period when the arbitrations are pending, AHB-to-HTB bus bridge 315 must hold AHB bus 300 while waiting for HTB arbitration. This can seriously degrade system performance since no activity will be occurring on AHB bus 300 during this period. AHB bus 300 will be the most active bus in most systems. To relieve this stall condition during a write condition, a write buffer is provided within AHB-to-HTB bus bridge 315.

Figure 5:
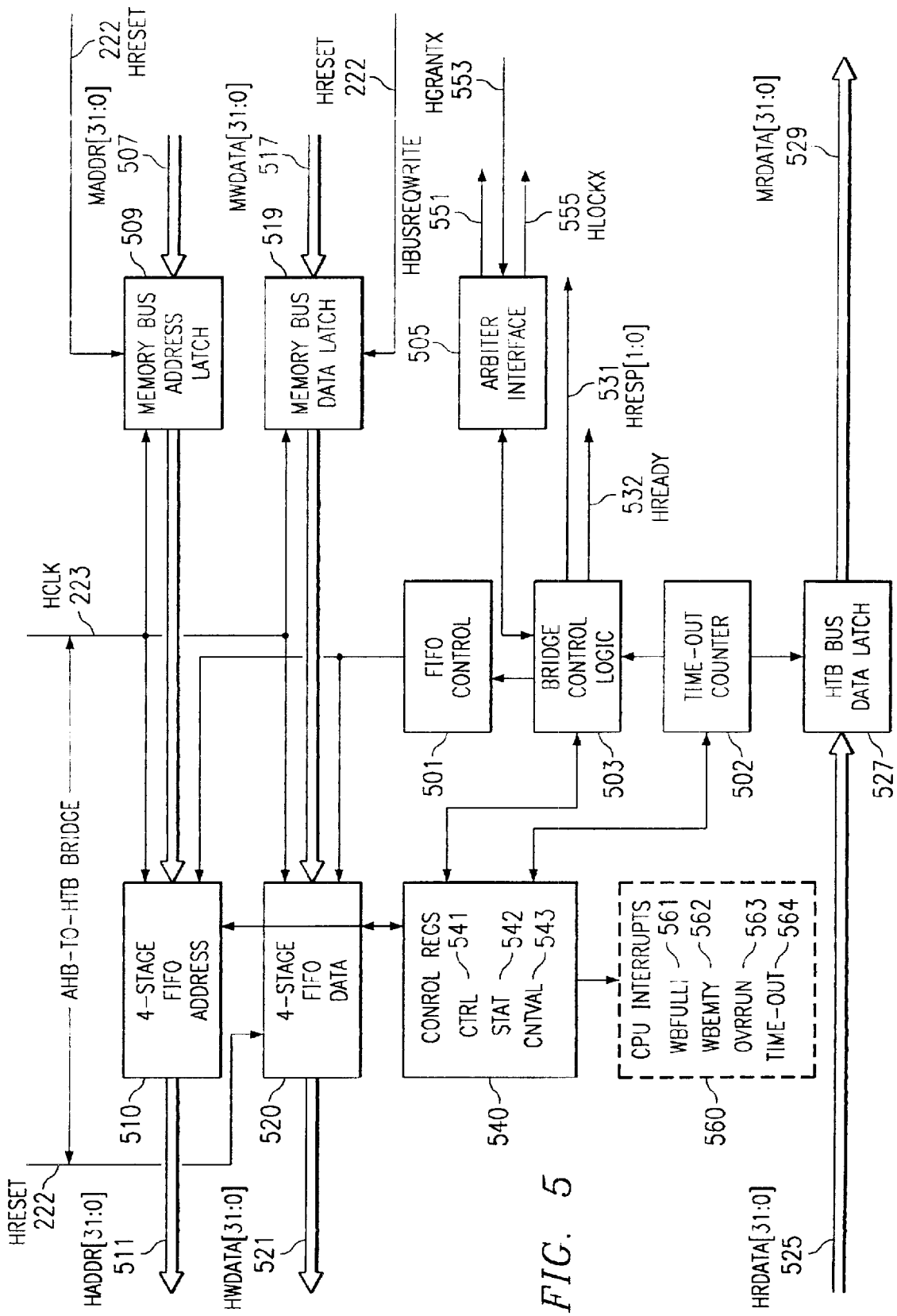
FIG. 5 illustrates the AHB-to-HTB bus bridge block diagram.

FIG. 5 illustrates the internal construction of AHB-to-HTB bus bridge 315. AHB-to-HTB bus bridge 315 includes FIFO control 501, bridge control logic 503 and AHB-HTB time-out counter 502 as shown. The full codings of control registers 540 (including CTRL register 541, STAT register 542 and CNTVAL register 543) are described below. Each of the control registers of control registers 540 are accessible by CPU 301. The write buffer is essentially a pair of FIFOs 510 and 520 with respective input register stages 509 and 519. Address FIFO 510 and data FIFO 520 have the same number of stages. FIG. 5 illustrates an example of 4 stages. Memory bus address latch 509 latches the full address from AHB bus 300. Memory bus data latch 519 latches the data from AHB bus 300. This differs from a traditional write buffer used in a cache scheme, where either the address or data is usually latched and then written back to the memory. The write buffer of this inventions allows an AHB bus device to write data to the HTB bus device without having to wait for arbitration. So long as the write buffer is not full, AHB bus 300 will not stall due to waiting for arbitration on HTB bus 330.

If write buffer FIFOs 510 and 520 becomes full, bridge control logic 503 sets a WBFULL status bit within STAT register 542. If interrupt is enabled via a WBFULLE bit of CTRL register 541, then bridge control logic 503 generates an interrupt WBFULLI 561. If AHB bus 300 writes another word when the write buffer FIFOs 510 and 520 are full, the previous word will be overwritten and lost. Under these conditions bridge control logic 503 generates OVRRUN interrupt 563 if overrun interrupts are enabled via a WBOI bit of STAT register 542. To prevent the loss of data, software of each writing device must make sure an overrun condition is not created. When a full buffer becomes empty, bridge control logic 503 generates another interrupt WBEMTY 562 if a WBEMTYE bit of STAT register 542 enables such an interrupt.

In order to write to a HTB bus peripheral, CPU 301 or DMA 303 must first be granted control of AHB bus 300 by AHB bus arbiter 410. Then AHB-to-HTB bus bridge 315 must be granted control of HTB bus 330 by HTB bus arbiter/decoder 421. When the AHB-to-HTB bus bridge 315 is granted control of HTB bus 330, AHB-to-HTB bus bridge 315 will supply the address latched in address FIFO 510 to HTB bus arbiter/decoder 421. HTB bus arbiter/decoder 421 will decode this address to supply the necessary chip select signals analogous to select signal 112 illustrated in FIGS. 1 and 2. Since the entire system contains only one memory map, this will not cause any conflicts to other devices on other busses. When generating this address on HTB bus 330, AHB-to-HTB bus bridge 315 will follow standard AHB bus timings, pipelining the address one cycle before outputting the data.

To prevent possible read-after-write (RAW) errors, if there is any data in write buffer FIFOs 510 and 520, AHB-to-HTB bus bridge 315 will not allow a read from HTB bus 330 until write buffer FIFOs 510 and 520 have cleared. If a read request is made, time-out counter 502 will start while write buffer FIFOs 510 and 520 are emptying data.

Referring again to FIG. 5, when the first word is written to AHB-to-HTB bus bridge 315 from AHB bus 300, the full address will be latched into memory bus address latch 509 and data will be latched in memory bus data latch 519. When latched, the AHB-to-HTB bus bridge 315 will make a request HBusReqWrite 551 to the HTB Bus 330. A grant is acknowledged by grant signal HGrantx 553. If granted, the address in memory bus address latch 509 will be supplied to HAddr bus 511 and data in memory bus data latch 519 will be supplied to HData bus 521. This supply may be via write buffers FIFOs 510 and 520 if these FIFOs contain data. Arbiter interface 505 will also generate HLockx signal 546 to HTB arbiter/decoder 421. It not granted, the AHB-to-HTB bus bridge 315 can store more address and data in FIFOs 510 and 520 until these FIFOs are full. When the FIFOs 510 and 520 are full, AHB-to-HTB bus bridge 315 signals a not READY event 532 to the master on AHB bus 300.

Time-out counter 502 starts when AHB-to-HTB bus bridge 315 attempts to arbitrate to obtain control of HTB bus 330. The count of time-out counter 502 is initialized by the value stored in CNTVAL register 543. Time-out counter 502 is selectively enabled by the state of a TOE bit of CTRL register 541. Upon time-out, bridge control logic sets a TOI bit of STAT register 542. Control registers 540 also generates a time-out interrupt 564 if time-out interrupts are enabled by a TOIE bit of CTRL register 541. Following such a time-out, when AHB-to-HTB bus bridge 315 is granted control of HTB bus 330, bridge control logic 503 sets a RAI bit of status register 542. Additionally, AHB-to-HTB bus bridge 315 generates a read available interrupt (RAI) 565 AI interrupt is enabled by the RAIE bit of CTRL register 541.

The following is a summary of the content of the three control registers illustrated as block 540 of FIG. 5 which are a part of AHB-to-HTB bus bridge 315. The coding of control register CTRL 541 is listed in Table 1.

TABLE 1

| Bits | Mnemonic | Definition |
| --- | --- | --- |
| 15:7 | Reserved | Reads undefined, writes no effect |
| 6 | WBFULLE | Write Buffer Full Interrupt Enable If Write Buffer Full 0 = no interrupt: 1 = will interrupt |
| 5 | WBEMTYE | Write Buffer Empty Interrupt Enable If Write Buffer Empty 0 = no interrupt: 1 = will interrupt |
| 4 | RAIE | Read Available Interrupt Enable If Read Available 0 = no interrupt: 1 = will interrupt |
| 3 | WBOIE | Write Buffer Over-run Interrupt Enable If Write Buffer Over-run 0 = no interrupt: 1 = will interrupt |
| 2 | WBE | Write Buffer Enable 0 = not enabled: 1 = enabled |
| 1 | TOIE | Time-Out Interrupt Enable If Time-Out Counter reaches 0 × 00 0 = no interrupt: 1 = will interrupt |
| 0 | TOE | Time-Out Enable 0 = not enabled: 1 = enabled |

Regarding the Write Buffer Enable bit (WBE), the size of the write buffer is determined upon manufacture. The example of FIG. 5 includes a four stage write buffer. Regarding the time-out interrupt enable bit (TOIE), when the time-out counter 502 reaches 0×00, an interrupt is generated. If this bit is set, the interrupt will be sent to CPU 301. Regarding the time-out enable bit (TOE), this selectively enables the time-out count-down register. This can be used to free CPU 301 to perform another task if AHB-to-HTB bus bridge 315 cannot win arbitration on HTB 330 bus in the time period of time-out counter 502.

The coding of status register STATUS 542 is listed in Table 2.

TABLE 2

| Bits | Mnemonic | Definition |
| --- | --- | --- |
| 15:6 | Reserved | Reads undefined, writes no effect |
| 5 | WBFULL | Write Buffer Full 0 = not full: 1 = full |
| 4 | WBEMTY | Write Buffer Empty 0 = not empty: 1 = empty |
| 3 | RAI | Read Available Interrupt After a time-out event, AHB-to-HTB bus bridge has finally won arbitration 0 = Data may not be read from HTB bus 1 = Data may be read from HTB bus |
| 2 | WBOI | Write Buffer Overrun Interrupt 0 = Data not overwritten: 1 = Data overwritten |
| 1 | WBF | Write Buffer Full. 0 = not full: 1 = full |
| 0 | TOI | Time-Out Interrupt 0 = No Time-Out or not enabled 1 = Time-Out counter has reached 0 |

Regarding the write buffer full bit (WBF), it is generally used to detect when the entire write buffer has been filled by writes to AHB-to-HTB bus bridge 315 and write buffer FIFOs 510 and 520 have not had a chance to write the data to HTB bus 330. This bit will become inactive as soon as a single location within write buffer FIFOs 510 and 520 is free. If write buffer FIFOs 510 and 520 are full and another write occurs, the previous data in the write buffer will be lost. Regarding the write buffer empty bit (WBEMTY), this is active when the entire write buffer FIFOs 510 and 520 are empty. If write buffer FIFOs 510 and 520 had been full previously and then becomes empty, an interrupt is generated. Regarding the read available interrupt bit (RAI), this indicates that, after a time-out has occurred, that AHB-to-HTB bus bridge 315 has finally won arbitration and that the AHB bus device may proceed with a read. Regarding the write buffer overrun interrupt bit (WBOI), this indicates that the buffer was full and another write occurred, overwriting some data. This should not happen in normal operation. When write buffer FIFOs 510 and 520 are full, an HReady signal 532 on AHB bus 300 will be pulled high by AHB-to-HTB bus bridge 315 indicating no more transfers should occur. Regarding the write buffer full bit (WBF), this is a read-only status signal which indicates that write buffer FIFOs 510 and 520 are full and cannot accept new data. When active the write buffer full bit (WBF) also indicates that HReady signal 532 is active for AHB-to-HTB bus bridge 315. Regarding the time-out interrupt bit (TOI), this is active when time-out counter 502 reaches 0. This timer is provided so that during a read to HTB 330, if an unacceptable amount of time is required to win arbitration by AHB-to-HTB bus bridge 315 on behalf of CPU 301, that CPU 301 may switch to another task and continue doing useful work.

The coding of counter value register CNTVAL 543 is listed in Table 3.

TABLE 3

| Bits | Mnemonic | Definition |
|------|----------|------------|
| 15:0 | CNTVAL | Start value for the Time-Out counter<br>The number of HCLK cycles to time-out |

The counter value register CNTVAL 543 stores the start value for time-out counter 502. Upon expiration of the count of time-out counter 502, bridge control logic generates time-out interrupt 564 if the TOIE bit of CTRL register 541 enables such interrupts. Note that the TOE bit of CTRL register 541 controls whether time-out counter 503 is enabled or disabled. This counter may be used during a read operation. If a peripheral already has won arbitration of HTB bus 330 and will not relinquish control due to a real-time constraint, the user may program a value here that will determine how many HCLK cycles to wait before causing a time-out interrupt. This time-out interrupt will permit CPU 301 on AHB bus 300 to stop waiting for a HTB bus grant and continue doing other operations such as running another task.

AHB-to-HTB bus bridge 315 further includes HTB bus data latch 529. HTB bus latch 529 latches data from read from HTB bus 330 via HRData bus 527 and supplies data to the AHB bus 300 via MRData bus 531. Note that AHB-to-HTB bus bridge 315 is a slave to AHB bus 300. Thus AHB-to-HTB bus bridge 315 cannot make a read or write request on AHB bus 300. Since AHB-to-HTB bus bridge 315 cannot make read or write requests, it cannot source an address to AHB bus 300. Accordingly, AHB-to-HTB bus bridge 315 does not need a HTB bus address latch.

What is claimed is:

1. A data transfer system comprising:
 a plurality of first bus devices, at least one first bus device being a first bus data supplying device capable of supplying data, at least one first bus device being a first bus data receiving device capable of receiving data and at least one first bus device being a first bus master device capable of requesting and controlling data transfer;
 a first data bus connected to each of said plurality of first bus devices and capable of transferring data from a first bus data supplying device to a first bus data receiving device under control of a first bus master device;
 a plurality of second bus devices, at least one second bus device being a second bus data supplying device capable of supplying data, at least one second bus device being a second bus data receiving device capable of receiving data and at least one second bus device being a second bus master device capable of requesting and controlling data transfer;
 a second data bus connected to each of said plurality of second bus devices and capable of transferring data from a second bus data supplying device to a second bus data receiving device under control of a second bus master device;
 a bus bridge connected to said first data bus and said second data bus, said bus bridge capable of supplying data to said first bus, receiving data from said first bus, supplying data to said second bus, receiving data from said second bus, not capable of controlling data transfer on said first bus and capable of controlling data transfer on said second bus, said bus bridge including
  an address first-in-first-out memory having a predetermined number of entries including an input connected to said first bus and an output connected to said second bus, and
  a data first-in-first-out memory having said predetermined number of entries including an input connected to said first bus and an output connected to said second bus,
  wherein said bus bridge does not allow a read request over the second bus until address first-in-first-out memory and data first-in-first-out memory are empty.
2. The data transfer apparatus of claim 1, further comprising:
 a first bus arbiter connected to each of said at least one first bus master device and said first bus, said first bus arbiter granting control of data transfer on said first bus to one and only one first bus master; and
 a second bus arbiter connected to each of said at least one second bus master device, said second bus and said bus bridge, said second bus arbiter granting control of data transfer on said first bus to one and only one of the set of devices including each second bus master and said bus bridge,
 wherein the first data bus is an advanced high performance bus (AHB) and the second data bus is a high performance data transfer bus (HTB).
3. The data transfer system of claim 1, wherein:
 at least one first bus device being a first bus supplying/receiving device capable of both supplying data to said first bus and receiving data from said first bus.
4. The data transfer system of claim 3, wherein:
 at least one first bus supplying/receiving device consists of a central processing unit which is further capable of controlling data transfer.

5. The data transfer system of claim 3, wherein:
at least one first bus supplying/receiving device consists of a direct memory access unit which is further capable of controlling data transfer.

6. The data transfer system of claim 3, wherein:
at least one first bus supplying/receiving device consists of a memory which is not capable of controlling data transfer.

7. The data transfer system of claim 3, wherein:
at least one first bus supplying/receiving device consists of a central processing unit which is further capable of controlling data transfer; and
said bus bridge further including at least one control register accessible by said central processing unit, said bus bridge setting a predetermined buffer full bit of said at least one control register when said address first-in-first-out memory and said data first-in-first-out memory are full.

8. The data transfer system of claim 3, wherein:
at least one first bus supplying/receiving device consists of a central processing unit which is further capable of controlling data transfer; and
said bus bridge further operable to generate an interrupt of said central processing unit when said address first-in-first-out memory and said data first-in-first-out memory are full.

9. The data transfer system of claim 8, wherein:
said bus bridge further including at least one control register accessible by said central processing unit including a buffer full interrupt enable bit, said bus bridge selectively generating an interrupt of said central processing unit when said address first-in-first-out memory and said data first-in-first-out memory are full and said buffer full interrupt enable bit has a predetermined digital state.

10. The data transfer system of claim 3, wherein:
at least one first bus supplying/receiving device consists of a central processing unit which is further capable of controlling data transfer; and
said bus bridge further including at least one control register accessible by said central processing unit, said bus bridge setting a predetermined buffer empty bit of said at least one control register when said address first-in-first-out memory and said data first-in-first-out memory are empty.

11. The data transfer system of claim 3, wherein:
at least one first bus supplying/receiving device consists of a central processing unit which is further capable of controlling data transfer; and
said bus bridge further operable to generate an interrupt of said central processing unit when said address first-in-first-out memory and said data first-in-first-out memory are empty.

12. The data transfer system of claim 11, wherein:
said bus bridge further including at least one control register accessible by said central processing unit including a buffer full interrupt enable bit, said bus bridge selectively generating an interrupt of said central processing unit when said address first-in-first-out memory and said data first-in-first-out memory are full and said buffer full interrupt enable bit has a predetermined digital state.

13. The data transfer system of claim 3, wherein:
at least one first bus supplying/receiving device consists of a central processing unit which is further capable of controlling data transfer; and
said bus bridge further including at least one control register accessible by said central processing unit, said bus bridge setting a predetermined buffer full bit of said at least one control register when an entry in said address first-in-first-out memory and said data first-in-first-out memory has been overwritten.

14. The data transfer system of claim 3, wherein:
at least one first bus supplying/receiving device consists of a central processing unit which is further capable of controlling data transfer; and
said bus bridge further operable to generate an interrupt of said central processing unit when an entry in said address first-in-first-out memory and said data first-in-first-out memory has been overwritten.

15. The data transfer system of claim 14, wherein:
said bus bridge further including at least one control register accessible by said central processing unit including a buffer full interrupt enable bit, said bus bridge selectively generating an interrupt of said central processing unit when an entry in said address first-in-first-out memory and said data first-in-first-out memory has been overwritten and said buffer full interrupt enable bit has a predetermined digital state.

* * * * *